US005605979A

United States Patent [19]
Priddy, Jr. et al.

[11] Patent Number: 5,605,979
[45] Date of Patent: Feb. 25, 1997

[54] METHOD FOR MODIFYING THE BACKBONE OF POLYMERIC RESINS

[75] Inventors: Duane B. Priddy, Jr.; Robert J. Kumpf, both of Pittsburgh, Pa.

[73] Assignee: Bayer Corporation, Pittsburgh, Pa.

[21] Appl. No.: 447,333

[22] Filed: May 22, 1995

[51] Int. Cl.$^6$ .................................................. C08F 20/00
[52] U.S. Cl. ........................ 525/439; 525/437; 525/466; 524/779; 524/783; 524/784; 524/785
[58] Field of Search ................................. 525/437, 439, 525/466; 524/779, 783, 784, 785

[56] References Cited

U.S. PATENT DOCUMENTS 5,191,038  3/1993  Krabbenhoft et al. .................. 525/462

Primary Examiner—Samuel A. Acquah
Attorney, Agent, or Firm—Joseph C. Gil; Aron Preis

[57] ABSTRACT

A process is disclosed whereby a polymeric resin (containing ester and/or carbonate bonds) is readily converted into a resin having a modified molecular structure. Accordingly, a cyclic carbonate (a monomer or oligomer) is transesterified with the polymer resin in the melt, preferably upon extrusion, optionally in the presence of a catalyst. Significantly, the cyclic carbonate which may include any of a variety of functional groups may, by the inventive process, be inserted into the structure of the polymer, effecting a modification to the structure and the properties of the resin. Among the disclosed beneficial modifications thus imparted to the resin are improved thermal stability, altered rheology and optical properties.

32 Claims, No Drawings

METHOD FOR MODIFYING THE BACKBONE OF POLYMERIC RESINS

The invention concerns a transesterification process for modifying a polymeric resin, more particularly the process concerns a transesterification reaction in the melt between a cyclic carbonate and a polycarbonate or a polyester resin.

A process is disclosed whereby a polymeric resin (containing ester and/or carbonate bonds) is readily converted into a resin having a modified molecular structure. Accordingly, a cyclic carbonate (a monomer or oligomer) is transesterified with the polymer resin in the melt, preferably upon extrusion, optionally in the presence of a catalyst. Significantly, the cyclic carbonate which may include any of a variety of functional groups may, by the inventive process, be inserted into the structure of the polymer, effecting a modification to the structure and the properties of the resin. Among the disclosed beneficial modifications thus impaled to the resin are improved thermal stability, altered rheology and optical properties.

Polycarbonate polyesters and polyestercarbonate resins and methods for their manufacture are known. Transesterification as a method for making polyesters and polycarbonates is also well known. See in this regard Chemistry and Physics of Polycarbonate, by Hermann Schnell Interscience Publishers, John Wiley & Sons, Inc., 1964, pp. 44–51 and in Polycarbonate by William F. Christopher and Daniel W. Fox; Reihhold Publishing Corporation, New York, 1962, pp. 13–15.

Three different exchange reactions for esters, carbonates and mixed ester/carbonates have been described: (Porter et al in Polym. Eng. Sci. 1989, 29, 55).

Intermolecular alcoholysis,

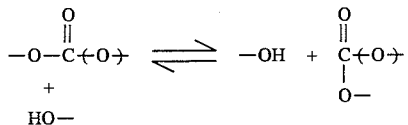

intermolecular acidolysis,

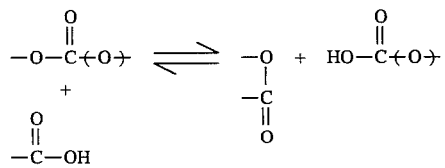

and transesterification.

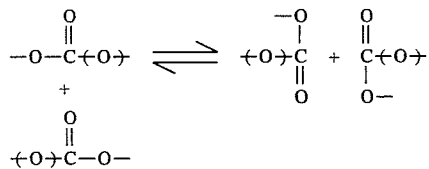

Alcoholysis and acidolysis occur, by definition, between an end-group and the main chain. Generally, transesterification refers to an intermolecular reaction between chains. In the present context, transesterification refers to interchanges between a cyclic carbonate and a carbonate and/or ester bond.

Stabilizers, among other functional additives, are commonly incorporated into polycarbonates, polyesters and polyestercarbonates by physical mixing. Due in part to their relatively small size, concerns with such stabilizers include their toxicity, volatility, blooming, rate of diffusion, leaching, plasticization and distribution within the matrix. Some of these problems have been investigated. In the area of polymeric antioxidants, for example, note may be made of an article by Coleman et al. in Macromolecules 1994, 27, 127 and of the references mentioned therein.

Bayer researchers, Schnell and Bottenbruch, first prepared cyclic oligomeric aromatic carbonates in low yields during the early 1960's. The preparation and reported utilization of low molecular weight, low viscosity cyclic precursors that may be ring-opened to form high molecular weight polymers have been reported by Brunelle et al. in Indian Journal of Technology Vol 31, April–June 1993, pp 234–246 and in J. Amer. Chem. Soc., 1990, 112, 2399. Ring-opening polymerization of such cyclics is reported to lead to complete conversion to high molecular weight linear polymers.

The use of in situ polymerization of bisphenol-A carbonate cyclic oligomers in the preparation of blends with styrene-acrylonitrile copolymer has also been reported—Warren L. Nachlis in Polymer, Vol 36, No. 17, 1994, pp 3643 et seq.

The art also includes U.S. Pat. No. 5,281,669 which disclosed easily flowable blends containing linear polymers and oligomers having an overall cyclic structure, and U.S. Pat. No. 4,605,731 which disclosed a method for preparing polycarbonate resins from cyclic polycarbonate oligomers, the reaction being catalyzed by a particular borate compound.

Most relevant in the present context is U.S. Pat. No. 5,162,459 which disclosed a blend of polycarbonate with a cyclic polycarbonate oligomer containing hydroquinone carbonate structural units and a ring-opening polycarbonate formation catalyst.

Nowhere has a process been described entailing transesterifying a resin containing carbonate and/or ester bonds with a cyclic-oligocarbonate, a process resulting in insertion of the cyclic carbonate into the, preferably linear, high-molecular weight polycarbonate, resulting in a structurally modified resin. While the following text which describes the invention refers primarily to polycarbonate resins, it is to be understood that the invention is directed to the modification of any polymer resin the repeat units of which contain carbonate and/or ester bonds.

The present invention is predicated on the finding that cyclocarbonates, optionally containing a radical, moiety or group the inclusion of which in the structure of the resin effects a change in the properties of the resin (herein Group), may advantageously be inserted, by transesterification reaction, in the melt, into the structure of polycarbonates, polyesters or polyestercarbonate resins. The reaction results in a structurally modified resin, featuring changed properties. The resulting properties of the resin are determined by the efficiency of the process and by the identity and relative amount of the cyclocarbonate and/or Group thus inserted.

It is the objective of the present invention to disclose a process for the modification of resins, the repeat unit of which contain a carbonate and/or ester bonds, enabling the preparation of modified resins having customized chemistries and properties.

This and other objectives are attained by the presently disclosed invention as will be disclosed in detail below.

DETAILED DESCRIPTION OF THE INVENTION

Shown below are schematic representations of the inventive process: polycarbonate being but a representative of the resins which may thus be modified and cyclic oligocarbonate representing the cyclic carbonates useful in the inventive reaction. In the context of the present invention, transesterification refers to an intermolecular reaction between chains; more particularly to interchanges between a cyclic carbonate and a polycarbonate, preferably a linear polycarbonate. According to the schematic representation, a polycarbonate resin is transesterified in the melt, for instance in an extruder, optionally in the presence of a suitable transesterification catalyst, with a cyclic carbonate oligomer, the process results in a modified polycarbonate. Schematically, the process of the invention may be represented by and as follows:

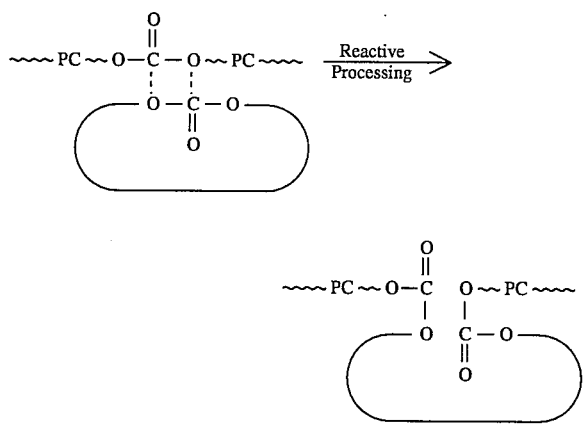

and by

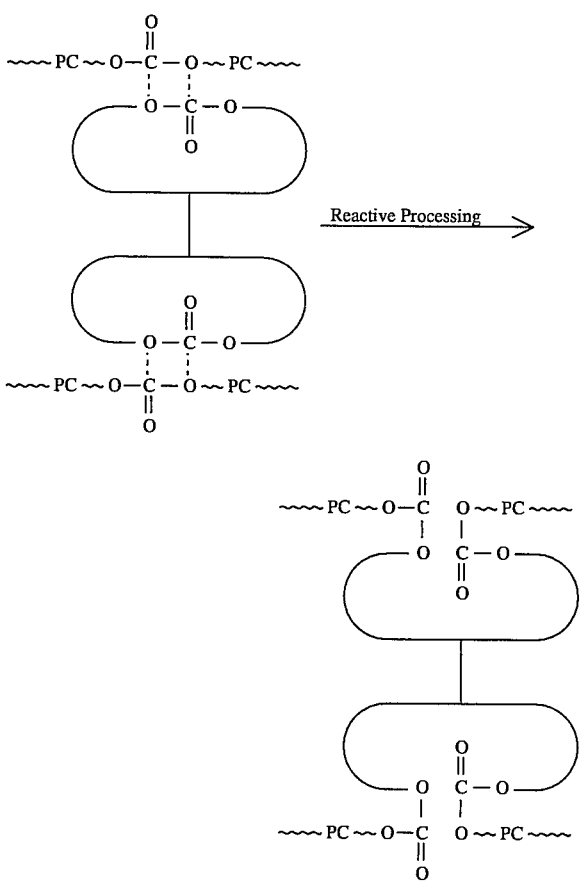

Cyclic carbonates which are suitable in the presently disclosed invention may be synthesized by an interfacial process in either of the following three ways: (A) a bisphenol may first be made into its corresponding bischloroformate which is then cyclized, the result is that a bisphenol is present in each repeat unit, (B) different bischlorofomate compositions can be ratioed to achieve the desired composition, and (C) a desired moiety may be reacted in its bisphenolic form (up to 20 mole %) with bisphenol A bischloroformate. These are represented schematically as Synthesis A:

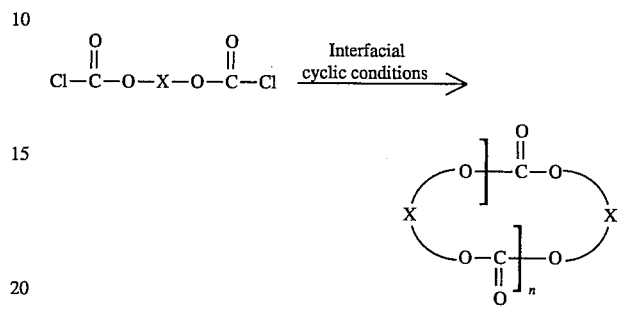

Synthesis B:

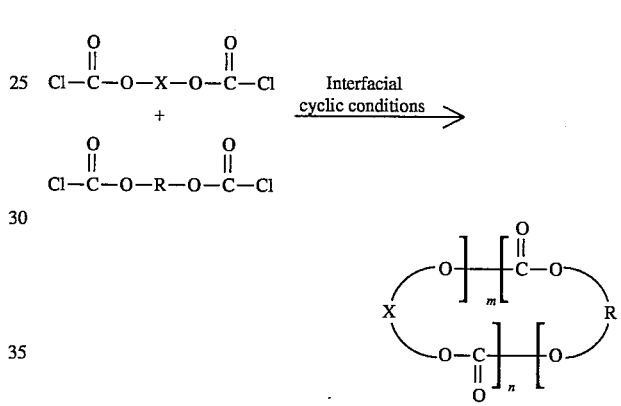

Synthesis C:

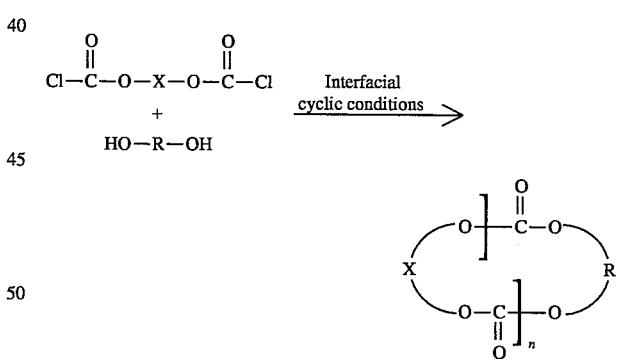

where X and R independently denote residues, and n and m are the respective degrees of cyclization. The term "residue" as used herein refers to the structure of a bischloroformate without its carbonyl groups or its chlorine atoms, and to the structure of a dihydroxy compound without the hydroxy groups. Monocyclic carbonates which are suitable in the process of the present invention are known and their preparation is conventional. An example of a suitable monocyclic is 1,3-dioxolan-2-one (ethylene carbonate).

The present invention relates to a transesterification process, reacting a polycarbonate resin with at least one cyclic carbonate, optionally in the presence of a suitable catalyst, carried out in the melt, preferably in an extruder or in other apparatus enabling melt processing of the reactants, preferably at temperatures in the range of 250° to 350° C. and at a residence time sufficient to enable the transesterification reaction, preferably up to about 5 minutes, resulting in the insertion of said carbonate in the resin. The cyclic carbonate optionally contains a Group, as previously defined. The resulting properties of the resin are determined by the efficiency of the process and by the identity and relative amount of the cyclocarbonate and/or Group thus inserted. In the present context, the terms "functionalized cyclic carbonate" refers to cyclic carbonates the structure of which includes Group(s).

Any one, or combination of functionalized cyclic carbonates may be thus inserted resulting in a modified resin, the modification in this instance amounting to conferring the function of Group included in the functionalized cyclic carbonate onto the resin. The functionalized cyclic carbonate may include Groups the functions of which impart to the resin improved mechanical and/or physical properties, mold release properties, optical properties, such as UV stability or antioxidation characteristics, to name but a few. Examples of suitable group include triphenylphosphine, benzophenone and BHT which groups impart stability to the resin, radicals which contain phosphorus and/or sulphur atoms which impart flame retardance to the resin and groups effecting the compatibility of the resin in blends with other resins. One or more of these functionalized cyclic carbonates may be inserted, optionally simultaneously, in accordance with the invention to modify a conventional, commercially available resins.

The methods for making functionalized cyclic carbonate suitable in the practice of the present invention are known. Informative in connection with cyclic oligocarbonates is included in the article entitled "Preparation of Ring-Opening Polymerization of Cyclic Oligomeric Aromatic Carbonates" by Daniel J. Brunelle et al, in Indian Journal of Technology, Vol 31, April–June 1993, pp 234–246 which text is incorporated herein by reference. Also incorporated herein by reference are the relevant disclosures in U.S. Pat. No. 4,727,134 and in Preparation and Polymerization of Bisphenol A Cyclic Oligomeric Carbonates by D. J. Brunelle and T. G. Shannon, Macromolecules, 1991, 24, p. 3035–3044 and in Ring-Opening Polymerization: Mechanisms, Catalysis, Structure, Utility (1993), Hanser Publishers, Chapter 11, p. 309–336.

One method for the preparation of cyclic oligocarbonates entails a triethylamine-catalyzed hydrolysis/condensation reaction of bischloroformate. The cyclic carbonate suitable in the present invention is a member selected form the group consisting of

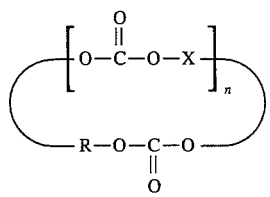

(I)

and

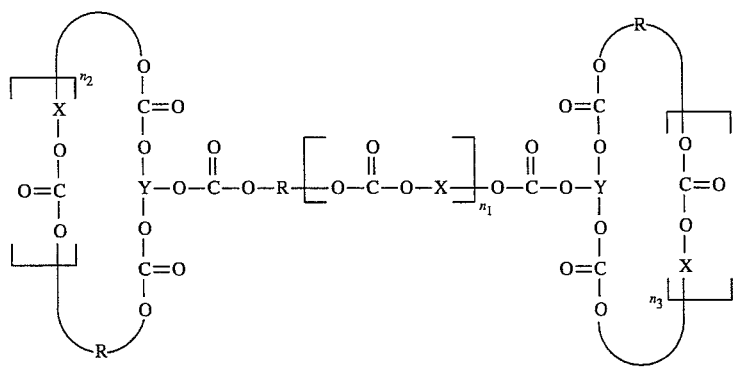

(II)

wherein X and R independently denote an aliphatic, cycloaliphatic or an aromatic residue of a dihydroxy compound or of a bischloroformate, and where R may optionally contain a Group, Y denotes a trifunctional or tetrafunctional nucleophile, n, $n_1$, $n_2$ and $n_3$ independently denote an integer of 0 to 16. It is specifically understood that, in view of the disclosure in U.S. Pat. No. 5,162,459 the scope of the present invention does not include, and specifically excludes, the catalyst-free transesterification of polycarbonate resin with a functionalized cyclic oligocarbonate conforming to (I) wherein R is the residue of hydroquinone; also presently excluded is the product of this reaction.

An illustrative example of the process of the invention is the insertion, in a polycarbonate resin, of a functional cyclic oligocarbonate wherein Group conform to

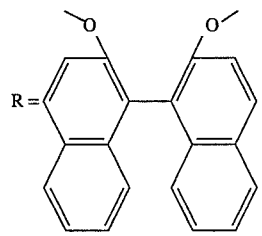

The thus modified polycarbonate exhibits UV-filtering properties.

The optional catalyst useful in the process of the present invention is selected from the group consisting of dibutyltin oxide, cobalt (II) acetate tetrahydrate, antimony (III) oxide, manganese (II) acetate tetrahydrate, titanium (IV) butoxide, zinc acetate dihydrate, dibutyltin dilaurate, tin(II) acetate, tetramethyldiacetoxystannoxane, tin (IV) oxide, lead(II)

acetate trihydrate, dibutyltin diacetate and titanium (IV) bis(ethylacetoacetate).

The polycarbonate modified in accordance with the inventive process are homopolycarbonates and copolycarbonates and mixtures thereof. The polycarbonates generally have a weight average molecular weight of 10,000–200,000, preferably 20,000–80,000 and their melt flow rate, per ASTM D-1238 at 300° C., is about 1 to about 65 g/10 min., preferably about 2–15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incorporated herein by reference). Dihydroxy compounds suitable for the preparation of the polycarbonates of the invention conform to the structural formulae (1) or (2).

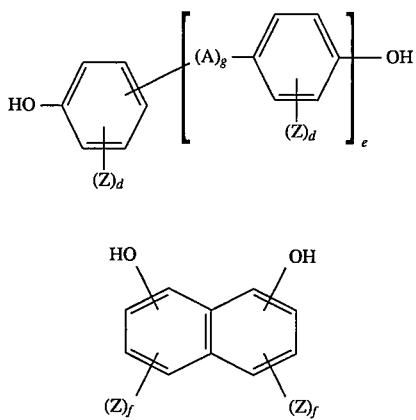

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, or $SO_2$, or

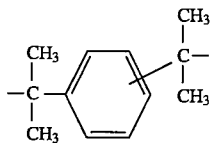

g and e denotes 0 or 1; Z denotes F,Cl,Br or $C_{1-4}$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonate resins suitable as reactants in the process of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates suitable as reactants in the process of the invention may also be branched by condensing therein small quantities, e.g., 0.05–2.0 mole % (relative to the bisphenols) of polyhydroxyl compounds.

Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxyphenyl)propane and 1,4-bis-(4,4'-dihydroxy-triphenylmethyl)-benzene. Some of the other polyfunctional compounds are 2,4-dihydroxybenzoic acid, trimesic acid, cyanuric chloride and 3,3-bis-(4-hydroxyphenyl)2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references, U.S. Pat. Nos. 3,028,365; 2,999,846; 3,153,008; and 2,991,273. The preferred process for the preparation of polycarbonates is the interfacial polycondensation process. Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5–24, 13–16, 7.5–13.0 and 3.5–6.5 g/10 min., respectively. These are products of Bayer Corporation of Pittsburgh, Pa.

A polycarbonate resin suitable in the practice of the invention is known and its structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

The preferred embodiment of the inventive process is carried out using linear polycarbonate resin.

The (co)polyester suitable in the present invention comprise repeat units from at least one $C_{6-20}$ aromatic, $C_{3-20}$ aliphatic or alicyclic dicarboxylic acid and repeat units from at least one $C_{2-20}$ aliphatic glycol. Examples of the dicarboxylic acids include malonic, succinic, glutaric, adipic, pimelic, suberic, azelaic, sebacic, dodecanedioic, 1,4-, 1,5- and 2,6-decahydronaphthalene dicarboxylic acid, and cis- or trans-1,4-cyclohexane dicarboxylic acid. Examples of useful aromatic dicarboxylic acid are terephthalic acid; isophthalic acid; 4,4'-biphenyldicarboxylic acid; trans 3,3'- and trans 4,4'-stilbenedicarboxylic acid, 4,4'-dibenyldicarboxylic acid; 1,4-, 1,5'-, 2,3'-, 2,6, and 2,7-naphthalenedicarboxylic acid. The preferred dicarboxylic acids are terephthalic and isophthalic acid or mixtures thereof.

The preferred glycol of the (co)polyester includes 2 to 8 carbon atoms. Examples include ethylene glycol, 1,2-propylene glycol, 1,3-propanediol, 1,4-butanediol, 1,5-pentanediol, 1,6-hexanediol, 1,2-, 1,3- and 1,4-cyclohexanedimethanol, neopentyl glycol, and 2,2,4,4-tetra-methyl-1,3-cyclobutanediol. The preferred diols are 1,4-cyclohexanedimethanol, ethylene glycol and mixtures thereof.

The preferred (co)polyesters include resins having repeat units from poly(ethylene terephthalate) or poly(1,4-cyclohexylenedimethylene terephthalate). Preferred (co)polyesters comprise repeat units from terephthalic acid, isophthalic acid or mixtures thereof and 1,4-cyclohexanedimethanol. Other preferred (co)polyesters comprise repeat units from terephthalic acid and 1,4-cyclohexanedimethanol, ethylene glycol or mixtures thereof.

The preparation of the (co)polyesters follow conventional procedures well known in the art such as the process described in U.S. Pat. No. 2,901,466 which disclosure is incorporated herein by reference.

The (co)polyesters of the invention have as a rule inherent viscosity of about 0.4 to 1.0 dl/g, preferably about 0.6 to 0.8 dl/g at 25° C. in a solvent containing 60 wt. % phenol and 40 wt. % tetrachloroethane. Among the other polymeric resins suitable for modification in accordance with the inventive process, mention may be made of polyestercarbonates and thermoplastic polyurethanes which contain ester segments.

The inventive process is preferably carried out in an extruder, preferably a twin screw extruder.

In the work presently described, the molecular weights (both the number average and weight average molecular weight) were determined by Gel Permeation Chromatography (GPC).

Gel Permeation Chromatography (GPC)

Molecular Weight Determination

For molecular weight determination, samples were analyzed on a Waters 150 C. high temperature gel permeation chromatography equipped with differential refractive index detector. Tetrahydrofuran served as the mobile phase. The conditions for GPC analysis were as follows. Four stainless steel columns (7.8×300 mm) were packed with PL Gel SDVB (2 mixed beds+1×500 A+1×100 Å) having a mean particle diameter of 10 μm. The flow rate was 1.0 mL/min. and the injection volume was 75 μL. A temperature of 35° C. was utilized for both GPC and the RI detector. Samples prepared to known concentration (~0.5%) were dissolved in the mobile phase and had toluene added as a flow standard. They were filtered through 0.5 μm PTFE disposable filters prior to analysis. Determination of molecular weight averages and distribution of the polycarbonate samples were based on polycarbonate standards using the Hamelic Broad Standard Calibration Method. The data analysis was done using PE-Nelsons' ACCESS*CHROM SEC software on a VAX based system.

Cyclic Insertion Characterization

Samples were analyzed on a Perkin Elmer HPLC equipped with the 235C Diode Array Dector, monitoring wavelengths 265 nm and 300 rim. The same conditions for GPC analysis as described above were followed with the following exceptions. The samples were prepared to a known concentration of 1% and no flow standard was added. The injection volume was 100 μl and the system was run at ambient temperature. Analysis of chromatograms (overlaying etc.) was performed using ACCESS*CHROM GC/LC software on a VAX based system.

High Performance Liquid Chromatography (HPLC)

The analysis was performed on a Perkin Elmer HPLC equipped with the Perkin Elmer 235C Diode Array Detector. The following chromatographic conditions were used for this model polymerization study:

Column: Hypersil MOS-2, RP C-8 (Keystone Scientific) 5 μm, 150×4.6 mm

Flow: 0.5 ml/min.

Sample Concentration: 1.0%, filtered with a 0.5 μm PTFE filter

Injection Volumer: 10 μm

Detector: Perkin Elmer 235C Diode Array Wavelengths monitored=254, 285 and 300 nm Solvent Gradient (linear gradient changes): Total run time=37 min.

| Time (min.) | Volume % THF | Volume % Water |
| --- | --- | --- |
| 0 | 60 | 40 |
| 15 | 80 | 20 |
| 3 | 100 | 0 |
| 4 | 100 | 0 |
| 10 | 60 | 40 |
| 5 | 60 | 40 |

With this technique, the formation of cyclic carbonates was determined. In addition, using this technique with detection at various known wavelengths allows for the confirmation that chromphores (e.q. binaphthol) were incorporated into cyclic carbonates.

Nuclear MaGnetic Resonance (NMR)

Proton ($^1$H) NMR spectra were obtained on a Varian 200 MHz instrument in a solvent combination of $CDCl_3$ and deuterated DMSO. All spectra were referenced to tetramethylsilane (TMS) at 0 ppm.

Makrolon 2408 is a commercial endcapped polycarbonate. This method was used to characterize the phenolic endgroups formed during processing, which can lead to quinone formation, hence color instability in polycarbonate. An integral ratio was determined of the phenoxy endgroup protons (8.3–8.4 ppm) relative to the six isopropylidine bisphenol A aliphatic protons (1.6–1.8 ppm) within the bisphenol A polycarbonate. This integral ratio allows for a qualitative comparison of the phenoxy endgroups formed during processing.

Melt flow rates were determined in accordance with ASTM Standard 1238.

The invention is further illustrated but is not intended to be limited by the following examples in which all parts and percentages are by weight unless otherwise specified.

EXAMPLES

Example 1

The synthesis of a cyclic carbonates containing binaphthol represents a modification of the procedure disclosed in *Ring-Opening Polymerization: Mechanisms, Catalysis, Structure, Utility;*, Brunelle, D. J., Ed.; Hanser Publishers: Munich; Vienna; New York; Barcelona, 1993, p. 309–335, also in Brunelle, D. J. et al "Preparation and Polymerization of Bisphenol A Cyclic Oligomeric Carbonates," *Macromolecules* 1991, 24, pp. 3035–3044 and Brunelle, D. J., et al "Recent Advances in the Chemistry of Aromatic Cyclic Oligomers," Makromol. Chem., Macromol Symp., Vol. 64, pp. 65–74 which are incorporated herein by reference.

A 1.0 liter Morton flask equipped with a mechanical stirrer and condenser was charged with $CH_2Cl_2$ (200 ml), water (7 ml), 9.75M NaOH (3 ml, 29 mmole), and triethylamine (2.4 ml, 17.25 mmole). The resulting solution was heated to reflux, vigorously stirred, and a 1.0M $CH_2Cl_2$ solution of bisphenol A-bischloroformate (0.18 mole, 63.58 g) and 1,1'-Bi-2-naphthol—herein binaphthol—(0.02 mole, 5.72 g) was added subsurface over the tip of the impeller at 6.7 ml/min., using a peristaltic pump. Concurrently, 9.75M NaOH (59 ml, 575 mmole) was delivered over 25 min. using a dropping funnel, and triethylamine (2.4 ml) was added over 28 min. using a syringe pump. Within 10 min. after complete bischloroformate addition, the phases were separated, washed with 1.0M HCl, then with water three times. Concentration of the product in vacuo afforded a nearly quantitative yield of product containing 85% cyclics by HPLC analysis. To isolate the cyclics from polymer, they were redissolved into $CH_2Cl_2$ and precipitated into 5 volumes acetone. As a result, the cyclics dissolved in acetone, whereas the polymer was precipitated and separated by filtration. Stripping the acetone in vacuo provided nearly pure cyclo-oligomers, containing ~10 mole % binaphthol, conforming to

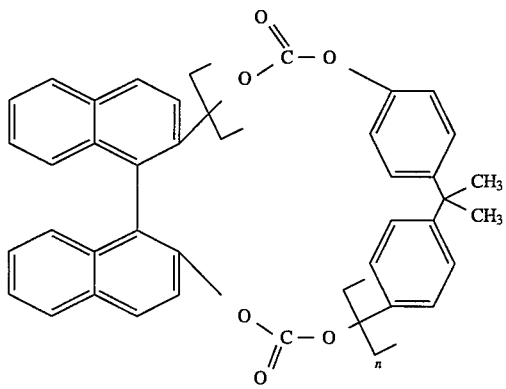

Contains ~10 mole % binaphthol
The product represents a mixture wherein n ranges up to about 16.

The incorporation of the binaphthol into the cyclic was confirmed by HPLC-UV/vis at different wavelengths.

Example 2

Cyclic oligocarbonates containing binaphthol (3 g) were dried and added to Makrolon 2608 resin (27 g). The mixture was then processed in a Haake Kneader, without catalyst, under the following conditions: 15 minutes, 200 rpm, nitrogen atmosphere.

The binaphthol moiety was determined by GPC equipped with a UV-vis detector to be evenly distributed in all molecular weights in the polycarbonate backbone. The schematic below represents the process:

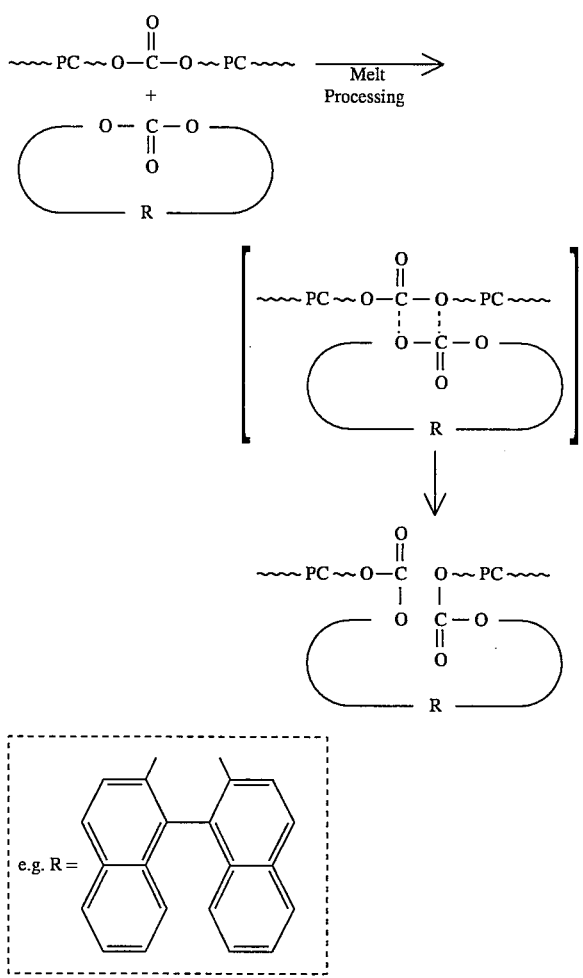

Example 3

The process of the invention has been demonstrated by carrying the experiment described in Example 2 was carried out except that for the addition of 300 ppm dibutyl tin oxide. In comparison to the product obtained in Example 2 above, an increase in the rate of insertion of the cyclic compounds into the polycarbonate backbone was observed. The rate of the cyclic insertion reaction was determined by taking aliquots of the melt during processing, and analyzing the extent of cyclic incorporation by GPC-UV/vis.

The molecular weight as determined by Gel Permeation Chromatography (GPC) was maintained. This is believed to be due to the cyclics having been inserted into the PC backbone by a transesterification mechanism; the binaphthol moiety was determined to be evenly distributed in all molecular weights in the polycarbonate backbone, as determined by GPC equipped with a UV-vis detector.

Example 4 (Comparative Example)

Shown below is a schematic representation of intermolecular hydrolysis of the polycarbonate backbone by a bisphenol, a process outside the scope of the present invention:

In this example, binaphthol was melt processed with polycarbonate resin in a level of 1 wt. %. As shown in table 1, the molecular weight had decreased as determined by Gel Permeation Chromatography. This is believed due to cleaving of chains by intermolecular alcoholysis.

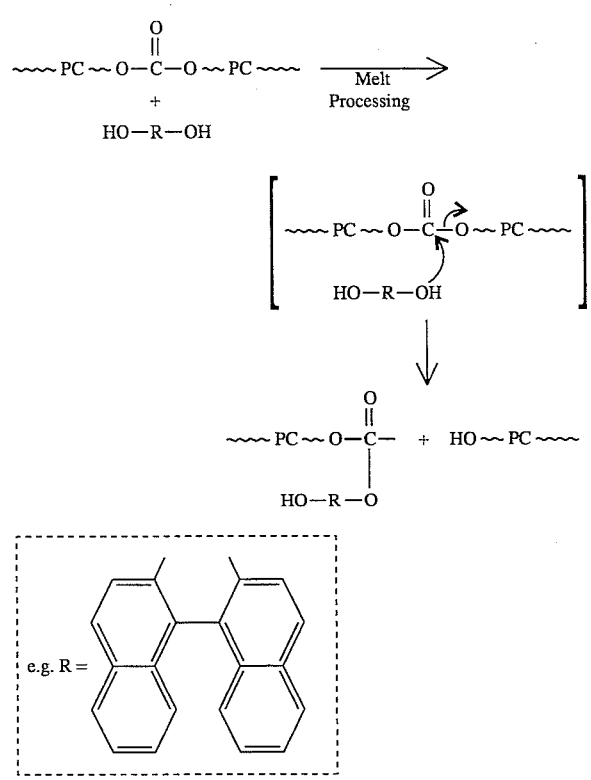

TABLE 1

Molecular Weight Characterization of Modified Polycarbonates

| Composition | Processing Conditions[a] | $Mn^b$ (Std. Dev.) g/mol | $Mw^b$ (Std. Dev.) g/mol | Mw/Mn |
|---|---|---|---|---|
| Makrolon 2408 | 300° C. 15 min. $N_2$, 200 rpm | 8740 (120) | 26870 (40) | 3.07 |
| Makrolon 2408 + Cyclic Carbonates with 10 mole % binaphtol (10 wt. %)* | 300° C. 15 min. $N_2$, 200 rpm | 7700 (480) | 25900 (480) | 3.36 |
| Makrolon 2408 + Cyclic Carbonates with 10 mole % binaphtol (10 wt. %)* + Dibutyltin oxide (300 ppm) | 300° C. 15 min. $N_2$, 200 rpm | 7950 (40) | 23020 (190) | 2.90 |
| Makrolon 2408 + Binaphtol (1 wt. %) | 300° C. 15 min. $N_2$, 200 rpm | 6680 (550) | 19270 (140) | 2.88 |
| Makrolon 2408 + Binaphtol (1 wt. %) + Dibutyltin oxide (300 ppm) | 300° C. 15 min. $N_2$, 200 rpm | 6390 (630) | 20460 (100) | 3.20 |

[a]Run in a Haake Kneader
[b]Determined by GPC
*10 wt. % cyclic = 1 wt. % binaphthol functionality The results show that when phenol-endcapped Makrolon 2408 homopolycarbonate resin is thermally processed (15 min. at 300° C.) the polycarbonate is molecular weight-stable (within 2–5%). Similarly, upon the incorporation (10 mole %) of the bisphenolic additive through a cyclic oligocarbonate (in accordance with the invention) by melt processing with Makrolon 2408 resin (10 wt. % cyclic=1 wt. % binaphthol functionality), the molecular weight has been maintained as shown in Table 1. In contrast, in a process where a binaphthol (1 wt. %) is directly melt processed with Makrolon 2408 resin under the same conditions, a significant decrease in molecular weight was observed along with a ~6 fold increase in phenoxy end-group formation as determined by NMR.

Example 5

The synthesis of cyclic-carbonates containing a Group designed to impart an anitplasticizing effect to the polycarbonate resin is based on a modification of the procedure described in the documents by Brunelle et al.mentioned in connection with Example 1 above. Antiplasticizing as used in the present context refers to imparting to a material a higher melt strength.

A 1.0 liter Morton flask-equipped with a mechanical stirrer and condenser was charged with $CH_2Cl_2$ (200 ml), water (7 ml), 9.75M NaOH (3 ml, 29 mmole), and triethylamine (2.4 ml, 17.25 mmole). The resulting solution was heated to reflux, vigorously stirred, and a 1.0M $CH_2Cl_2$ solution of bisphenol A-bischloroformate (0.18 mole, 63.58 g) and 1,1,1-tris-(4-hydroxy-phenyl)ethane—herein trisphenol—(0.02 mole 6.13 g) was added subsurface over the tip of the impeller at 6.7 ml/min., using a peristaltic pump. Concurrently, 9.75M NaOH (59 ml, 575 mmole) was delivered over 25 min. using a dropping funnel, and triethylamine (2.4 ml) was added over 28 min. using a syringe pump. Within 10 min. after complete bischloroformate addition, the phases were separated, washed with 1.0M HCl, then with water three times. Concentration of the product in vacuo afforded a nearly quantitative yield of product containing 85% cyclics by HPLC analysis. To isolate the cyclics from polymer, they were redissolved into $CH_2Cl_2$ and precipitated into 5 volumes acetone. As a result, the cyclics dissolved in acetone, whereas the polymer was precipitated and separated by filtration. Stripping the acetone in vacuo provided nearly pure cyclo-oligomers, containing ~10 mole % trisphenol. The incorporation of the additive into the cyclic was confirmed by HPLC. The cyclics were hydrolitically decomposed with a KOH/MeOH solution and the trisphenol was determined to be part of the structure.

Example 6

Melt processing in accordance with the inventive process of a 10 wt % cyclic carbonate [containing 10 mole % of trisphenol] with Makrolon 2408 resin resulted in a branched resin having modified rheology. A transesterification catalyst, dibutyltin oxide (DBTO), was used in the reaction. The schematic representation of this process has been shown above.

The rheology modification was determined by GPC and by measurement of the melt flow rate (MFR). The GPC measurements show an increase in molecular weight. The results (Table 2) showed the DBTO catalyst to cause a significant reduction in MFR.

TABLE 2

Molecular Weight and Melt Flow Characterization for Rheology Modified Polycarbonate.

| Composition | $Mn^a$ | $Mw^a$ | Mw/Mn | Met Flow Rate$^b$ (1.2 kg) | Melt Flow Rate$^b$ (10 kg) |
|---|---|---|---|---|---|
| Makrolon 2408 | 8000 | 28530 | 3.57 | 19.26 | 159.6 |
| Makrolon 2408 + Cyclic carbonate containing 10 mole % trisphenol* + Dibutyl tin oxide catalyst (300 ppm) | 10480 | 38370 | 3.66 | 6.31 | 66.96 |

$^a$Determined by GPC
$^b$MFR values taken at 300° C.
*10 wt. % cyclic = 1 wt. % trisphenol functionality

Example 7

A 1.0 liter Morton flask equipped with a mechanical stirrer and condenser was charged with $CH_2Cl_2$ (200 ml), water (7 ml), 9.75M NaOH (3 ml, 29 mmole), and triethylamine —$Et_3N$— (2.4 ml, 17.25 mmole). The solution is heated to reflux, vigorously stirred, and a solution of bisphenol A-bischloroformate (200 ml of 1.0M in $CH_2Cl_2$) is added subsurface over the tip of the impeller at 6.7 ml/min., using a peristaltic pump. Concurrently, 9.75M NaOH (59 ml, 575 mmole) was delivered over 25 min. using a dropping funnel, and $Et_3N$ (2.4 ml) was added over 28 min. using a syringe pump. Within 10 min. after complete bischloroformate addition, the phases were separated, washed with 1.0M HCl, then with water three times. Concentration of the product in vacuo afforded a nearly quantitative yield of product containing 85% cyclics by HPLC analysis. To isolate the cyclics from polymer, they were dissolved into $CH_2Cl_2$ and precipitated into 5 volumes acetone. As a result, the cyclics dissolve in acetone, whereas the polymer precipitated and was separated by filtration. Stripping the acetone in vacuo provided nearly pure cyclooligomers conforming to

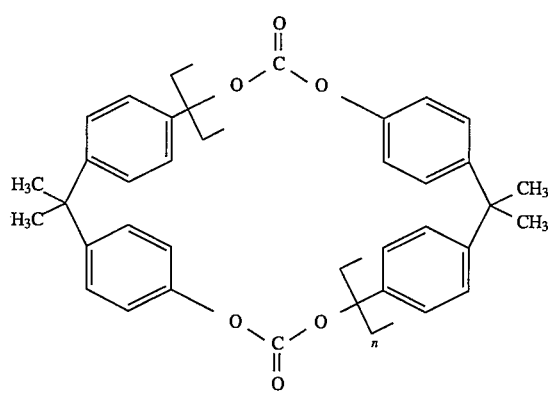

The product represents a mixture wherein n ranges up to about 16.

Example 8

The cyclic oligocarbonates based on bisphenol A prepared in Example 7 were melt blended with Makrolon 2608 polycarbonate resin in a Haake Kneader under the following conditions: 5 minutes, 300° C., 200 rpm. Transesterification catalysts (300 ppm) were introduced in the melt reaction to determine their relative efficacy in incorporating the cyclic carbonates into the linear polycarbonate by transesterification insertion. Gel Permeation Chromatography (GPC) equipped with a refractive index detector was used to characterize tile final resin in terms of molecular weight. The results are presented in Table 3.

The table shows the molecular weight characterization of polycarbonate resin which has been melt reacted with 10 wt. % cyclic oligocarbonates based on bisphenol A and the dependence of the molecular weight on the catalyst used in the reaction.

TABLE 3

| Example | System | Mn (g/mole) | Mw (g/mole) | Mw/Mn |
|---|---|---|---|---|
| A | Makrolon 2608 resin (no cyclics, no catalyst) | 10810 | 29170 | 2.7 |
| B | Makrolon 2608 resin, cyclics, no catalyst | 480 | 23870 | 49.7 |
| C | Dibutyltin Oxide | 12000 | 28080 | 2.3 |
| D | Cobalt (II) Acetate Tetrahydrate | 11850 | 27510 | 2.3 |
| E | Antimony (III) Oxide | 9950 | 23100 | 2.3 |
| F | Manganese (II) Acetate Tetrahydrate | 7540 | 24590 | 3.3 |
| G | Titanium (IV) Butoxide | 3800 | 25680 | 6.8 |
| H | Zinc Acetate Dihydrate | 3600 | 24780 | 6.9 |
| I | Dibutyltin Dilaurate | 3580 | 27820 | 7.8 |
| J | Tin (II) Acetate | 3490 | 25770 | 7.4 |
| K | Tetramethyldiacetoxy-stannoxane | 3440 | 24150 | 7.0 |
| L | Tin (IV) Oxide | 3440 | 25480 | 7.4 |
| M | Lead (II) Acetate Trihydrate | 2860 | 22240 | 7.8 |
| N | Dibutyltin Diacetate | 2250 | 25850 | 11.5 |
| O | Titanium (IV) bis (ethyl acetoacetate) | 2030 | 25720 | 12.7 |
| P | Sodium Benzoate | 1710 | 40050 | 23.4 |
| Q | Zirconium Acetylacetonate | 1380 | 24310 | 17.6 |
| R | Tetraphenylphosphonium Bromide | 977 | 25450 | 26.0 |

TABLE 3-continued

| Example | System | Mn (g/mole) | Mw (g/mole) | Mw/Mn |
|---------|--------|-------------|-------------|-------|
| S | Magnesium Oxide | 950 | 22430 | 23.6 |
| T | Zinc Acetylacetonate Hydrate | 930 | 24720 | 26.6 |
| U | Butyltin Hydroxide Oxide | 840 | 24460 | 29.1 |
| V | Tetrabutylammonium tetraphenylborate | 840 | 27220 | 32.4 |
| W | Zinc Carbonate Hydroxide Hydrate | 780 | 24790 | 31.8 |
| X | Aluminum Oxide | 750 | 24540 | 32.7 |
| Y | Tin (II) Oxide | 750 | 24680 | 32.9 |
| Z | p-Toluene Sulfonic Acid | 720 | 24190 | 33.6 |
| AA | Aluminum i-propoxide | 720 | 24190 | 33.6 |
| BB | Zirconium Isopropoxide | 630 | 23360 | 37.1 |
| CC | Zinc Oxide | 620 | 24610 | 39.7 |
| DD | Zirconium (IV) Butoxide | 570 | 22840 | 40.1 |

It can be seen that three transesterification catalysts result in a polycarbonate with a narrower polydispersity than the control resin (Example A—polydispersity=2.7). These are dibutyltin oxide, cobalt (II) acetate tetrahydrate, and antimony oxide. The high Mn value directly correlates with a low polydispersity value. The presence of cyclic carbonates gives a low value for Mn as shown in Example B in the table. Once these cyclics are randomly incorporated into the high molecular weight polycarbonate by transesterification insertion, the Mn increases and the polydispersity narrows.

Using common polymer forming catalysts (e.g. tetrabutylammonium tetraphenylborate, Example V), it can be seen that the Mn is very low and the polydispersity is large. Thus ring-opening polymerization catalysts are not effective in the transesterification insertion process of the present invention. While not wishing to be bound by theory, it is believed that at levels of 10 wt. %, there are not enough cyclics to undergo a ring-opening polymerization. Consequently, the cyclics are interacting mostly with linear polycarbonate. As a result, catalysts which promote transesterification insertion into the polycarbonate result in a final material with the cyclics randomly incorporated into all molecular we weights.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of modified resin comprising transesterification reaction in the melt of (i) a polymeric resin the repeat units of which contain at least one member selected from the group consisting of ester bond and carbonate bond with (ii) at least one cyclic carbonate having a molecular weight of about 80–10000 g/mole conforming to

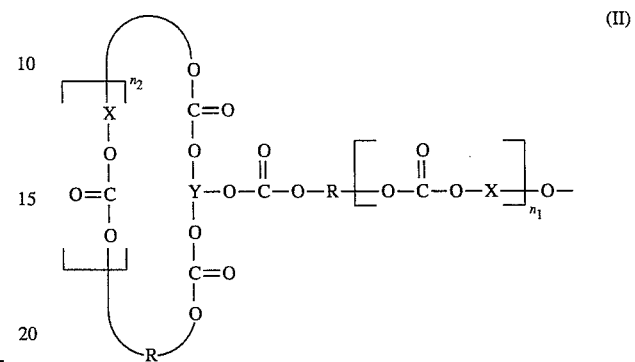

(II)

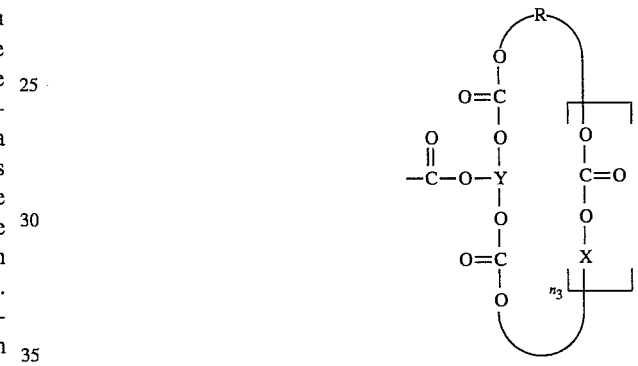

wherein X and R independently denote aliphatic, cycloaliphatic or an aromatic residues of a dihydroxy compound or of a bischloroformate, Y denotes a trifunctional nucleophile, and $n_1$, $n_2$ and $n_3$ independently denote an integer of 0 to 16, wherein said (i) is present in an amount of about 60 to 99.99 percent and said (ii) is present in an amount of about 0.01 to 40.0 percent said percent being relative to the total weight of said (i) and (ii).

2. A process for the preparation of modified resin comprising transesterification reaction in the melt of (i) a polymeric resin the repeat units of which contain at least one member selected from the group consisting of ester bond and carbonate bond with (ii) a cyclic carbonate having a molecular weight of about 80–10000 g/mole conforming to

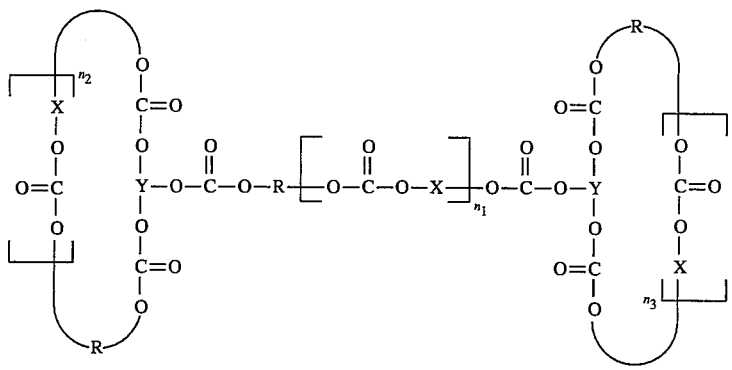

(II)

wherein X and R independently denote aliphatic, cycloaliphatic or an aromatic residue of a dihydroxy compound or of a bischloroformate, Y denotes a trifunctional nucleophile, and $n_1$, $n_2$ and $n_3$ independently denote an integer of 0 to 16, in the presence of a catalyst selected from the group consisting of dibutyltin oxide, cobalt (II) acetate tetrahydrate, antimony (III) oxide, manganese (II) acetate tetrahydrate, titanium (IV) butoxide, zinc acetate dihydrate, dibutyltin dilaurate, tin(II) acetate, tetramethyldiacetoxystannoxane, tin (IV) oxide, lead(II) acetate trihydrate, dibutyltin diacetate and titanium (IV) bis(ethylacetoacetate).

3. The process of claim 2 wherein said (i) is present in an amount of about 60 to 99.99 percent and said (ii) is present in an amount of about 0.01 to 40.0 percent said percent being relative to the total weight of said (i) and (ii).

4. The process of claim 1 wherein said (i) is present in an amount of about 90 to 99.99 percent and said (ii) is present in an amount of about 0.01 to 10.0 percent said percent being relative to the total weight of said (i) and (ii).

5. The process of claim 2 wherein said (i) is present in an amount of about 90 to 99.99 percent and said (ii) is present in an amount of about 0.01 to 10.0 percent said percent being relative to the total weight of said (i) and (ii).

6. The process of claim 1 wherein said reaction in the melt is carried out in an extruder.

7. The process of claim 1 wherein said reaction is carried out at temperatures in the range of 250° to 350° C. and at a residence time sufficient to enable the transesterification reaction.

8. The process of claim 2 wherein said reaction is carried out at temperatures in the range of 250° to 350° C. and at a residence time sufficient to enable the transesterification reaction.

9. The process of claim 8 wherein residence time is up to about 5 minutes.

10. The process of claim 1 wherein said resin is linear polycarbonate.

11. The process of claim 2 wherein said resin is linear polycarbonate.

12. The process of claim 1 wherein said resin is polyester.

13. The process of claim 2 wherein said resin is polyester.

14. The process of claim 11 wherein said catalyst is dibutyltin oxide.

15. The process of claim 11 wherein said catalyst is cobalt (II) acetate tetrahydrate.

16. The process of claim 11 wherein said catalyst is manganese (II) acetate tetrahydrate.

17. The process of claim 11 wherein said catalyst is antimony (III) oxide.

18. The process of claim 11 wherein said catalyst is titanium (IV) butoxide.

19. The process of claim 11 wherein said catalyst is zinc acetate dihydrate.

20. The process of claim 11 wherein said catalyst is dibutyltin dilaurate.

21. The process of claim 11 wherein said catalyst is tin(II) acetate.

22. The process of claim 11 wherein said catalyst is tetramethyl-diacetoxystannoxane.

23. The process of claim 11 wherein said catalyst is tin (IV) oxide.

24. The process of claim 11 wherein said catalyst is lead(II) acetate trihydrate.

25. The process of claim 11 wherein said catalyst is dibutyltin diacetate.

26. The process of claim 11 wherein said catalyst is titanium (IV) bis(ethylacetoacetate).

27. A process for the preparation of modified resin consisting essentially of transesterification reaction in the melt of (i) a polymeric resin the repeat units of which contain at least one member selected from the group consisting of ester bond and carbonate bond with (ii) at least one cyclic carbonate having a molecular weight of about 80–10000 g/mole conforming to

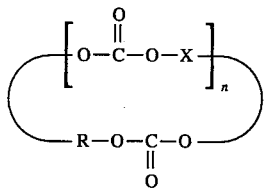

wherein X and R independently denote aliphatic, cycloaliphatic or an aromatic residue of a dihydroxy compound or of a bischloroformate, and n denotes an integer of 0 to 16, with the proviso that transesterification of polycarbonate resin with a cyclic carbonate where R is a residue of hydroquinone is excluded.

28. A process for the preparation of modified resin comprising transesterification reaction in the melt of (i) a polymeric resin the repeat units of which contain at least one member selected from the group consisting of ester bond and carbonate bond with (ii) at least one cyclic carbonates having a molecular weight of about 80–10000 g/mole conforming to

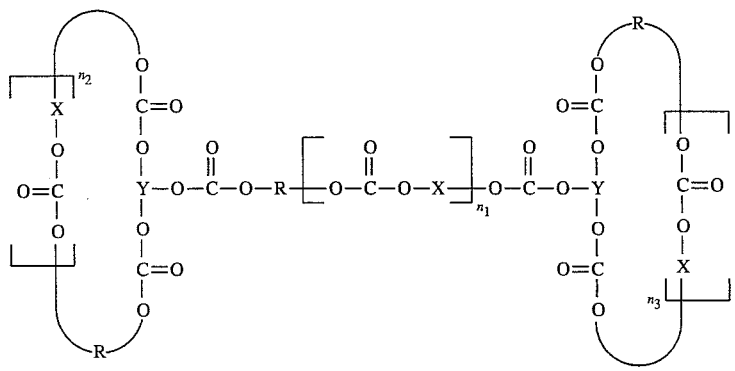

wherein X and R independently denote aliphatic, cycloaliphatic or aromatic residue of a dihydroxy compound or of a bischloroformate, Y denotes a trifunctional nucleophile, and $n_1$, $n_2$ and $n_3$ independently denote an integer of 0 to 16.

29. The process of claim 28 wherein said resin is linear polycarbonate.

30. The process of claim 28 wherein said resin is polyester.

31. A process for the preparation of modified resin consisting essentially of transesterification reaction in the melt of (i) a polymeric resin the repeat units of which contain at least one member selected from the group consisting of ester bond and carbonate bond with (ii) at least one cyclic carbonate having a molecular weight of about 80–10000 g/mole conforming to

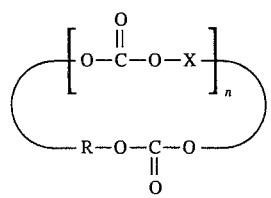

(I)

and

32. A process for the preparation of modified resin consisting essentially of transesterification reaction in the melt of (i) a polymeric resin the repeat units of which contain at least one member selected from the group consisting of ester bond and carbonate bond with (ii) a cyclic carbonate having a molecular weight of about 80–10000 g/mole conforming to

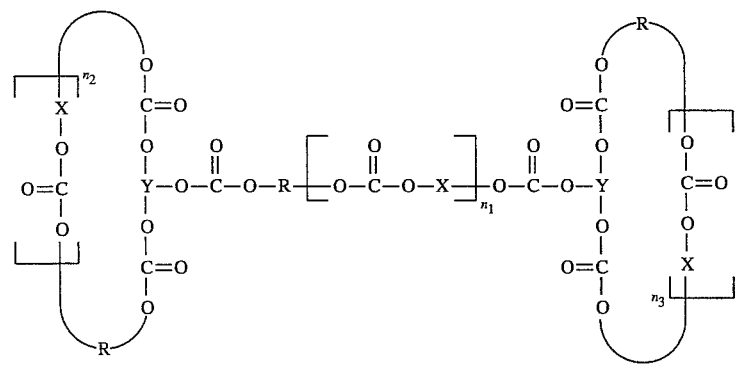

(II)

wherein X and R independently denote aliphatic, cycloaliphatic or an aromatic residues of a dihydroxy compound or of a bischloroformate, Y denotes a trifunctional nucleophile, and n, $n_1$, $n_2$ and $n_3$ independently denote an integer of 0 to 16, with the proviso that transesterification of polycarbonate resin with a cyclic carbonate conforming to (I) above where R is the residue of hydroquinone is excluded.

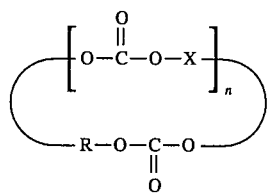
(I)

and

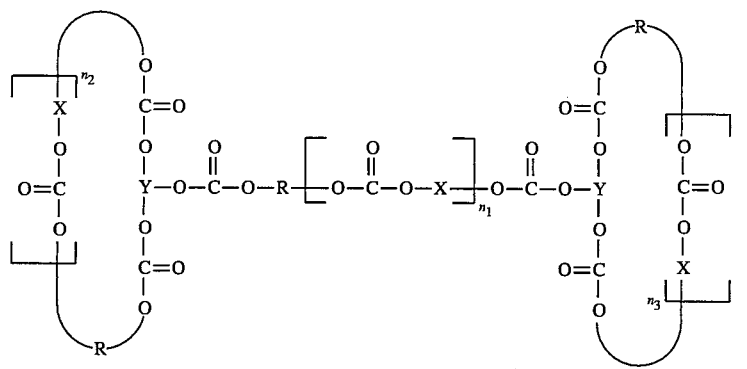
(II)

wherein X and R independently denote aliphatic, cycloaliphatic or an aromatic residue of a dihydroxy compound or of a bischloroformate, Y denotes a trifunctional nucleophile, and n, $n_1$, $n_2$ and $n_3$ independently denote an integer of 0 to 16, in the presence of a catalyst selected from the group consisting of dibutyltin oxide, cobalt (II) acetate tetrahydrate, antimony (III) oxide, manganese (II) acetate tetrahydrate, titanium (IV) butoxide, zinc acetate dihydrate, dibutyltin dilaurate, tin(II) acetate, tetramethyldiacetoxystannoxane, tin (IV) oxide, lead(II) acetate trihydrate, dibutyltin diacetate and titanium (IV) bis(ethylacetoacetate).

* * * * *